(12) United States Patent
Maynard et al.

(10) Patent No.: US 9,676,179 B2
(45) Date of Patent: Jun. 13, 2017

(54) APPARATUS FOR REDUCING FLASH FOR THERMAL TRANSFER PRINTERS

(75) Inventors: Raymond Eugene Maynard, Westerly, RI (US); Thomas Richard Helma, Wakefield, RI (US)

(73) Assignee: ZIH Corp., Lincolnshire, IL (US)

( * ) Notice: Subject to any disclaimer, the term of this patent is extended or adjusted under 35 U.S.C. 154(b) by 1178 days.

(21) Appl. No.: 12/351,823

(22) Filed: Jan. 10, 2009

(65) Prior Publication Data

US 2009/0175643 A1 Jul. 9, 2009

Related U.S. Application Data

(63) Continuation-in-part of application No. 11/406,548, filed on Apr. 19, 2006, now Pat. No. 7,870,824.

(Continued)

(51) Int. Cl.
*B41J 2/005* (2006.01)
*B32B 37/22* (2006.01)
(Continued)

(52) U.S. Cl.
CPC .......... *B41J 2/0057* (2013.01); *B32B 37/226* (2013.01); *B32B 38/10* (2013.01); *B41J 2/325* (2013.01);
(Continued)

(58) Field of Classification Search
CPC ... B32B 37/08; B32B 37/142; B32B 2425/00; F16C 2360/46; B41J 3/60; B41J 2/0057; B41J 2/325
(Continued)

(56) References Cited

U.S. PATENT DOCUMENTS

| 4,384,711 A | 5/1983 | Gabel et al. |
| 4,519,600 A | 5/1985 | Warwick et al. |

(Continued)

FOREIGN PATENT DOCUMENTS

| CN | 1120493 A | 4/1996 |
| CN | 1932655 A | 3/2007 |

(Continued)

OTHER PUBLICATIONS

Notice of Allowance from related U.S. Appl. No. 11/406,548, mailed Sep. 30, 2010.

(Continued)

*Primary Examiner* — Jennifer Simmons (57) ABSTRACT

The present disclosure is directed to a printing assembly that includes an image transfer station and a blower configured to intermittently provide a cooling stream of air to a product being printed upon. The blower may include a centrifugal fan and may have a single plenum providing air to two nozzles. The nozzles may be positioned such that the air targets the edges of the product to facilitate removal of the intermediate transfer media from the targeted areas and reduce the occurrence of flash. The blower may be configured to provide air when the product is expelled from the transfer assembly or while the intermediate transfer media is peeled from the product, but not to provide air when the product is being received by the transfer assembly. The printing assembly may include sensors and control circuitry for detecting the position of the product and controlling the blower accordingly.

24 Claims, 11 Drawing Sheets

Related U.S. Application Data (60) Provisional application No. 60/673,203, filed on Apr. 20, 2005.

(51) Int. Cl.
| | |
|---|---|
| *B32B 38/10* | (2006.01) |
| *B41J 2/325* | (2006.01) |
| *B41J 3/60* | (2006.01) |
| *B41J 13/12* | (2006.01) |
| *B32B 37/00* | (2006.01) |
| *B32B 37/08* | (2006.01) |
| *B32B 37/14* | (2006.01) |
| *B32B 38/00* | (2006.01) |
| *B32B 38/18* | (2006.01) |

(52) U.S. Cl.
CPC ............. *B41J 3/60* (2013.01); *B41J 13/12* (2013.01); *B32B 37/025* (2013.01); *B32B 37/08* (2013.01); *B32B 37/142* (2013.01); *B32B 38/0004* (2013.01); *B32B 38/18* (2013.01); *B32B 2425/00* (2013.01); *B32B 2429/00* (2013.01); *B32B 2519/02* (2013.01); *B41J 2202/34* (2013.01)

(58) Field of Classification Search
USPC ........... 101/33, 34, 485; 198/347.2; 400/521
IPC ................... B41J 13/12,3/60, 2/005, 2/315
See application file for complete search history.

(56) References Cited

U.S. PATENT DOCUMENTS

| | | | |
|---|---|---|---|
| 4,659,927 | A | 4/1987 | Tago et al. |
| 4,921,237 | A | 5/1990 | Nubson et al. |
| 5,009,411 | A | 4/1991 | Manderfeld et al. |
| 5,015,834 | A | 5/1991 | Suzuki et al. |
| 5,080,512 | A | 1/1992 | Schofield et al. |
| 5,111,239 | A | 5/1992 | Kamimura et al. |
| 5,277,501 | A | 1/1994 | Tanaka et al. |
| 5,299,796 | A | 4/1994 | Wooldridge |
| 5,342,132 | A | 8/1994 | Tanaka et al. |
| 5,344,808 | A | 9/1994 | Watanabe et al. |
| 5,374,944 | A | 12/1994 | Janosky et al. |
| 5,532,724 | A | 7/1996 | Inagaki et al. |
| 5,600,359 | A * | 2/1997 | Kikuchi ................. 347/171 |
| 5,724,642 | A | 3/1998 | Cala |
| 5,768,143 | A | 6/1998 | Fujimoto |
| 5,806,999 | A | 9/1998 | Kobayashi |
| 5,807,461 | A | 9/1998 | Hagstrom |
| 5,814,796 | A | 9/1998 | Benson et al. |
| 5,821,976 | A | 10/1998 | Inagaki et al. |
| 5,891,291 | A * | 4/1999 | Okamoto et al. .......... 156/273.9 |
| 5,956,067 | A | 9/1999 | Isono et al. |
| 6,039,480 | A | 3/2000 | Andoh et al. |
| 6,078,344 | A | 6/2000 | Wen et al. |
| 6,206,589 | B1 | 3/2001 | Bjork et al. |
| 6,236,420 | B1 | 5/2001 | Matsuzaka |
| 6,261,012 | B1 | 7/2001 | Haas et al. |
| 6,308,886 | B1 | 10/2001 | Benson et al. |
| 6,315,283 | B1 | 11/2001 | Haas et al. |
| 6,352,206 | B1 | 3/2002 | Ashley et al. |
| 6,377,291 | B2 | 4/2002 | Andoh et al. |
| 6,384,854 | B1 | 5/2002 | Ibs et al. |
| 6,386,772 | B1 | 5/2002 | Klinefelter et al. |
| RE37,726 | E | 6/2002 | Tanaka et al. |
| 6,406,935 | B2 | 6/2002 | Kayanakis et al. |
| 6,409,872 | B1 | 6/2002 | Campion et al. |
| 6,431,537 | B1 | 8/2002 | Meier |
| 6,431,540 | B1 | 8/2002 | Lien et al. |
| 6,446,832 | B1 | 9/2002 | Holec et al. |
| 6,457,886 | B1 | 10/2002 | Meier |
| 6,468,379 | B1 | 10/2002 | Naito et al. |
| 6,513,806 | B2 | 2/2003 | Yui |
| 6,522,841 | B2 * | 2/2003 | Horikoshi ................ 399/45 |
| 6,536,758 | B2 | 3/2003 | Meier et al. |
| 6,543,507 | B2 | 4/2003 | Lien |
| 6,554,044 | B2 | 4/2003 | Paulson et al. |
| 6,567,112 | B2 | 5/2003 | Suzuki |
| 6,587,135 | B1 | 7/2003 | Suzuki et al. |
| 6,612,571 | B2 | 9/2003 | Rider |
| RE38,295 | E | 11/2003 | Kobayashi et al. |
| 6,648,526 | B2 | 11/2003 | Kobayashi et al. |
| 6,664,993 | B2 | 12/2003 | Isono |
| 6,668,716 | B2 | 12/2003 | Tsuruta et al. |
| 6,679,637 | B2 | 1/2004 | Tsuruta et al. |
| 6,693,655 | B2 | 2/2004 | Fujimoto et al. |
| 6,694,884 | B2 | 2/2004 | Klinefelter et al. |
| 6,714,227 | B2 | 3/2004 | Honma et al. |
| 6,758,470 | B1 | 7/2004 | Meier et al. |
| 6,758,616 | B2 | 7/2004 | Pribula et al. |
| 6,762,780 | B2 | 7/2004 | Tsuruta et al. |
| 6,781,615 | B2 | 8/2004 | Tsuruta |
| 6,796,732 | B2 | 9/2004 | Kobayashi et al. |
| 6,830,392 | B2 | 12/2004 | Kobayashi et al. |
| 6,830,803 | B2 | 12/2004 | Vaidya et al. |
| 6,832,866 | B2 | 12/2004 | Klinefelter et al. |
| 6,873,348 | B1 | 3/2005 | Isono et al. |
| 6,880,991 | B2 | 4/2005 | Tsuruta et al. |
| 6,894,710 | B2 | 5/2005 | Suzuki et al. |
| 6,932,527 | B2 | 8/2005 | Pribula et al. |
| 6,945,524 | B2 | 9/2005 | Meier et al. |
| 6,953,154 | B2 | 10/2005 | Suzuki et al. |
| 6,963,351 | B2 | 11/2005 | Squires et al. |
| 6,979,141 | B2 | 12/2005 | Karst et al. |
| 7,018,117 | B2 | 3/2006 | Meier et al. |
| 7,037,013 | B2 | 5/2006 | Klinefelter et al. |
| 7,076,867 | B2 * | 7/2006 | Yamamoto et al. ............ 29/832 |
| 7,119,823 | B2 | 10/2006 | Takahashi et al. |
| 7,147,165 | B2 | 12/2006 | Mongin et al. |
| 7,173,643 | B2 | 2/2007 | Kubota et al. |
| 7,183,505 | B2 | 2/2007 | Mongin et al. |
| 7,237,485 | B2 | 7/2007 | Meier et al. |
| 2002/0178939 | A1 | 12/2002 | Tsuruta et al. |
| 2003/0216826 | A1 | 11/2003 | Klinefelter et al. |
| 2004/0108385 | A1 | 6/2004 | Suzuki et al. |
| 2004/0109715 | A1 | 6/2004 | Meier et al. |
| 2004/0146329 | A1 | 7/2004 | Klinefelter |
| 2004/0164169 | A1 | 8/2004 | Suzuki et al. |
| 2005/0017440 | A1 | 1/2005 | Jewell |
| 2005/0104281 | A1 | 5/2005 | Stender et al. |
| 2005/0140769 | A1 | 6/2005 | Kanemaru et al. |
| 2005/0275708 | A1 | 12/2005 | Squires et al. |
| 2006/0065718 | A1 | 3/2006 | Tsuruta |
| 2006/0123471 | A1 | 6/2006 | Fontanella et al. |
| 2006/0151935 | A1 | 7/2006 | Liatard et al. |
| 2006/0204308 | A1 | 9/2006 | Meier et al. |
| 2007/0056027 | A1 | 3/2007 | Nehowig et al. |
| 2007/0057057 | A1 | 3/2007 | Andresky et al. |
| 2007/0065187 | A1 | 3/2007 | Kodera et al. |
| 2007/0102104 | A1 | 5/2007 | Galles et al. |
| 2007/0122216 | A1 | 5/2007 | Omata |

FOREIGN PATENT DOCUMENTS

| | | |
|---|---|---|
| DE | 195 43 099 A1 | 5/1997 |
| EP | 1 371 493 A2 | 12/2003 |
| JP | H05-19642 A | 1/1993 |
| JP | H0699627 | 4/1994 |
| JP | 08 058125 A | 3/1996 |
| JP | 08058125 A * | 3/1996 |
| JP | 2000071410 | 3/2000 |
| JP | 2000238439 | 9/2000 |
| JP | 2001-331043 A | 11/2001 |
| JP | 2001331043 A * | 11/2001 |
| JP | 2002052678 | 2/2002 |
| JP | 2002086936 | 3/2002 |
| JP | 2002187370 | 7/2002 |
| JP | 2002205471 | 7/2002 |
| JP | 2002274060 | 9/2002 |
| JP | 2002307845 | 10/2002 |
| JP | 2002347355 | 12/2002 |
| JP | 2002362068 | 12/2002 |
| JP | 2003025745 | 1/2003 |

(56) References Cited

FOREIGN PATENT DOCUMENTS

| JP | 2003159879 | | | 6/2003 |
|---|---|---|---|---|
| JP | 2003165275 | | | 6/2003 |
| JP | 2003182251 | | | 7/2003 |
| JP | 2006181730 | A | * | 7/2006 |
| JP | 2006-321069 | A | | 11/2006 |
| JP | 2006321069 | A | * | 11/2006 |
| WO | WO 99/55530 | A1 | | 11/1999 |
| WO | WO 00/27634 | A1 | | 5/2000 |

OTHER PUBLICATIONS

International Search Report for International Appl. No. PCT/US2006/014793, mailed Feb. 9, 2007.
Written Opinion for International Appl. No. PCT/US2006/014793, mailed Feb. 9, 2007.
Office Action for Chinese Appl. No. 200680018028.1, dated May 22, 2009.
Office Action for Chinese Appl. No. 200680018028.1, dated Dec. 18, 2009.
Search Report and Written Opinion for International Application No. PCT/US2010/020409, mailed Aug. 4, 2010.
International Search Report for corresponding International Appl. No. PCT/US2010/020409, mailed Aug. 4, 2010.
European Patent Office, "Extended European Search Report," mailed Dec. 12, 2016, in connection with EP Patent Application No. 10729530.5 (8 pages).
The State Intellectual Property Office of People's Republic of China, "Second Office Action," issued in connection with Chinese Patent Application No. 201080011525.5 on Feb. 8, 2014 (10 pages).
Extended European Search Report dated May 20, 2016 in related Europe application 12199840.5.

* cited by examiner

APPARATUS FOR REDUCING FLASH FOR THERMAL TRANSFER PRINTERS

CROSS-REFERENCE TO RELATED APPLICATIONS

The present application is a continuation-in-part of U.S. application Ser. No. 11/406,548 filed on Apr. 19, 2006, which claims priority to U.S. Provisional Application No. 60/673,203 filed on Apr. 20, 2005, the contents of which are incorporated herein in their entirety.

FIELD OF THE INVENTION

The present invention is directed to a method, device, and system for reducing flash during image transfer operations to media cards or other products, and more particularly to a printing assembly including a device configured to provide a cooling stream of air near the product for facilitating removal of the intermediate transfer media from the product.

BACKGROUND

Various methods can be used to print an image to a media. One such method is thermal transfer printing, in which heat is used to transfer images from an intermediate transfer media ("IT media") to a product, such as a media card. The IT media generally includes a layer that is designed to adhere to the product when the layer is heated.

Typically, during thermal transfer printing, print dye is applied to the IT media. Further downstream in the printing process, portions of the IT media are transferred onto the product. In some cases, the size of the IT media may not correspond exactly with the size of the product. For example, the IT media may be larger than the product, and the edges of the IT media may extend over the edges of the product when the IT media is applied to the product. When the liner of the IT media is removed from the product following application of the IT media, the portions of the IT media that extend over the product edges may not be cleanly removed from the product, resulting in flash. Flash can cause the product to have diminished functionality and/or diminished aesthetic appeal.

Applicant has discovered then that it would be desirable to provide a printer adapted to print to a product using IT media in a manner that reliably and cost-effectively reduces flash. As described in greater detail below, a variety of challenges were identified and overcome through Applicant's efforts to invent and develop such a printer.

BRIEF SUMMARY

The present invention addresses the above needs and achieves other advantages by providing a printing assembly incorporating an image transfer assembly and a blower configured to intermittently provide a cooling stream of air to a product being printed upon for facilitating the removal of intermediate transfer media from the product and reducing the occurrence of flash.

In one embodiment, an intermediate transfer printing assembly is provided that is configured to transfer an image to a product. The intermediate transfer printing assembly comprises an intermediate transfer media comprising an image disposed thereon, a transfer assembly, and a blower configured to intermittently provide a cooling stream of air proximate the product. The transfer assembly includes a transfer device and is configured to transfer the image from the intermediate transfer media to the product. In particular, the product and intermediate transfer media are received into the transfer assembly along a first direction, the intermediate transfer media is compressed between the transfer device and the product, the product is expelled from the transfer assembly along a second direction, and the intermediate transfer media is peeled from the product such that the image is transferred from the intermediate transfer media to the product.

In some cases, the blower is configured to selectively provide the cooling stream of air proximate the product when the product is expelled from the transfer assembly along the second direction, but not provide the cooling stream of air proximate the product when the product is received into the transfer assembly along the first direction. The product may define an edge, and the blower may be configured to direct the cooling stream of air towards the edge. In some embodiments, the transfer assembly may be a single-pass double-sided transfer assembly that is configured to transfer first and second images from the intermediate transfer media to opposed image-receptive surfaces of the product.

The printing assembly may also include one or more sensors and control circuitry disposed in communication with the sensor(s). The sensors may be configured to detect the position of the product relative to the transfer assembly. Furthermore, the control circuitry may be configured to engage the blower to provide the cooling stream of air proximate the product when the product is disposed in a first position relative to the transfer assembly and not provide the cooling stream of air proximate the product when the product is disposed in a second position relative to the transfer assembly.

In some cases, the blower may comprise a single plenum in fluid communication with two nozzles. The product may define two edges extending in the first direction, and each nozzle may be positioned proximate a respective edge of the product. The transfer assembly may also include at least one peel bar positioned proximate a surface of the product. The peel bar and the transfer device may collectively define a chamber, and each nozzle may be positioned in fluid communication with the chamber to direct the cooling stream of air through the chamber. In some cases, the blower may include a centrifugal fan.

In other embodiments, an intermediate transfer printing assembly is provided that includes an intermediate transfer media comprising an image disposed thereon, a transfer assembly, at least one sensor configured to detect the position of the product relative to the transfer assembly, a blower, and control circuitry disposed in communication with the sensor(s). The transfer assembly may include a transfer device and may be configured to transfer the image from the intermediate transfer media to the product. The blower may be configured to provide a cooling stream of air proximate the product. In addition, the control circuitry may be configured to engage the blower to provide the cooling stream of air proximate the product when the product is disposed in a first position relative to the transfer assembly and not provide the cooling stream of air proximate the product when the product is disposed in a second position relative to the transfer assembly.

In some cases, the sensor and control circuitry may be configured to selectively engage the blower to provide the cooling stream of air when the product is expelled from the transfer assembly, but not provide the cooling stream of air when the product is received into the transfer assembly.

Furthermore, the product may define an edge, and the blower may be configured to direct the cooling stream of air towards the edge.

The transfer assembly may be a single-pass double-sided transfer assembly that is configured to transfer first and second images from the intermediate transfer media to opposed image-receptive surfaces of the product. In addition, the blower may include a single plenum in fluid communication with two nozzles. The blower may also include a centrifugal fan.

In other embodiments, an intermediate transfer printing assembly may be provided that includes an intermediate transfer media comprising an image disposed thereon and a transfer assembly comprising a transfer device. The transfer assembly may be configured to transfer the image from the intermediate transfer media to the product by receiving the product and intermediate transfer media into the transfer assembly along a first direction such that the intermediate transfer media is compressed between the transfer device and the product, expelling the product from the transfer assembly along a second direction such that the intermediate transfer media is peeled from the product, and providing a cooling stream of air proximate an interface between the intermediate transfer media and the product while the intermediate transfer media is peeled from the product.

The printing assembly may further include at least one sensor configured to detect the position of the product relative to the transfer assembly and control circuitry disposed in communication with the sensor(s). The control circuitry may be configured to engage the blower to provide the cooling stream of air proximate the product when the product is positioned for peeling of the intermediate transfer media from the product.

In some cases, the transfer assembly may include a blower that includes a single plenum in fluid communication with two nozzles. Furthermore, the product may define two edges extending in the first direction, and each nozzle may be positioned proximate a respective edge of the product. The blower may also include a centrifugal fan.

Therefore, as described below in greater detail, a printing assembly is provided for facilitating the removal of intermediate transfer media from the product and reducing the occurrence of flash.

BRIEF DESCRIPTION OF THE SEVERAL VIEWS OF THE DRAWINGS

Reference is now made to the accompanying drawings, which are not necessarily drawn to scale, and wherein.

DETAILED DESCRIPTION OF THE INVENTION

A number of executions of the present invention now will be described more fully hereinafter with reference to the accompanying drawings, in which some, but not all embodiments of the inventions are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

As described in greater detail below, a printing assembly is provided that includes an image transfer assembly and a blower configured to intermittently provide a cooling stream of air to a product. The blower may include a centrifugal fan and may have a single plenum providing air to two nozzles. The nozzles may be positioned such that the air flows over the edges of the product or other locations where flash may occur. The blower may be configured to provide air when the product is expelled from the transfer assembly and/or while the intermediate transfer media is peeled from the product, but not to provide air when the product is being received by the transfer assembly. The printing assembly may further include sensors and control circuitry for detecting the position of the product relative to the transfer assembly and controlling the blower based on the detected position.

Reducing the occurrence of flash according to embodiments of the present invention provides various advantages in addition to enhancing the aesthetic appeal of the product, as will be apparent to those of ordinary skill in the art in light of the disclosure that follows. For example, the described embodiments allow greater freedom over the time required to print to the product and may generally allow for faster printing times. In addition, a greater number of potential printing designs may be possible, such as designs that include printing that is unevenly distributed across the surface of the product, which are typically more difficult to print in thermal systems. Moreover, embodiments of the present invention may allow for printing to different types of substrates, such as substrates made of various materials, having different thicknesses, or including different coatings that may have different heat transfer characteristics.

For illustration purposes, the specification below describes intermediate transfer printing assemblies that are structured to print or otherwise process media cards. It is noted however, that the present invention is not limited to use with media cards and may, in fact, incorporate printing assemblies that are structured to print or otherwise process any type of "product," including but not limited to media cards, labels, RFID tags, smart cards, printable objects, and the like. Such products may be comprised of cellulose-based materials (e.g., paper, cardboard, wood, etc.), polymers, metals, laminates, composites, films, and other similar materials.

Further, also for illustration purposes, the specification describes image transfer stations that are incorporated within or used by printers. It is noted however, that embodiments of the present invention are not limited to use within printers and may, in fact, embody image transfer stations that are used within a variety of media processing devices, including but not limited to card printers, label printers, desk top printers, laminators, RFID readers, encoders, or other similar media processing assemblies.

Figure 1:
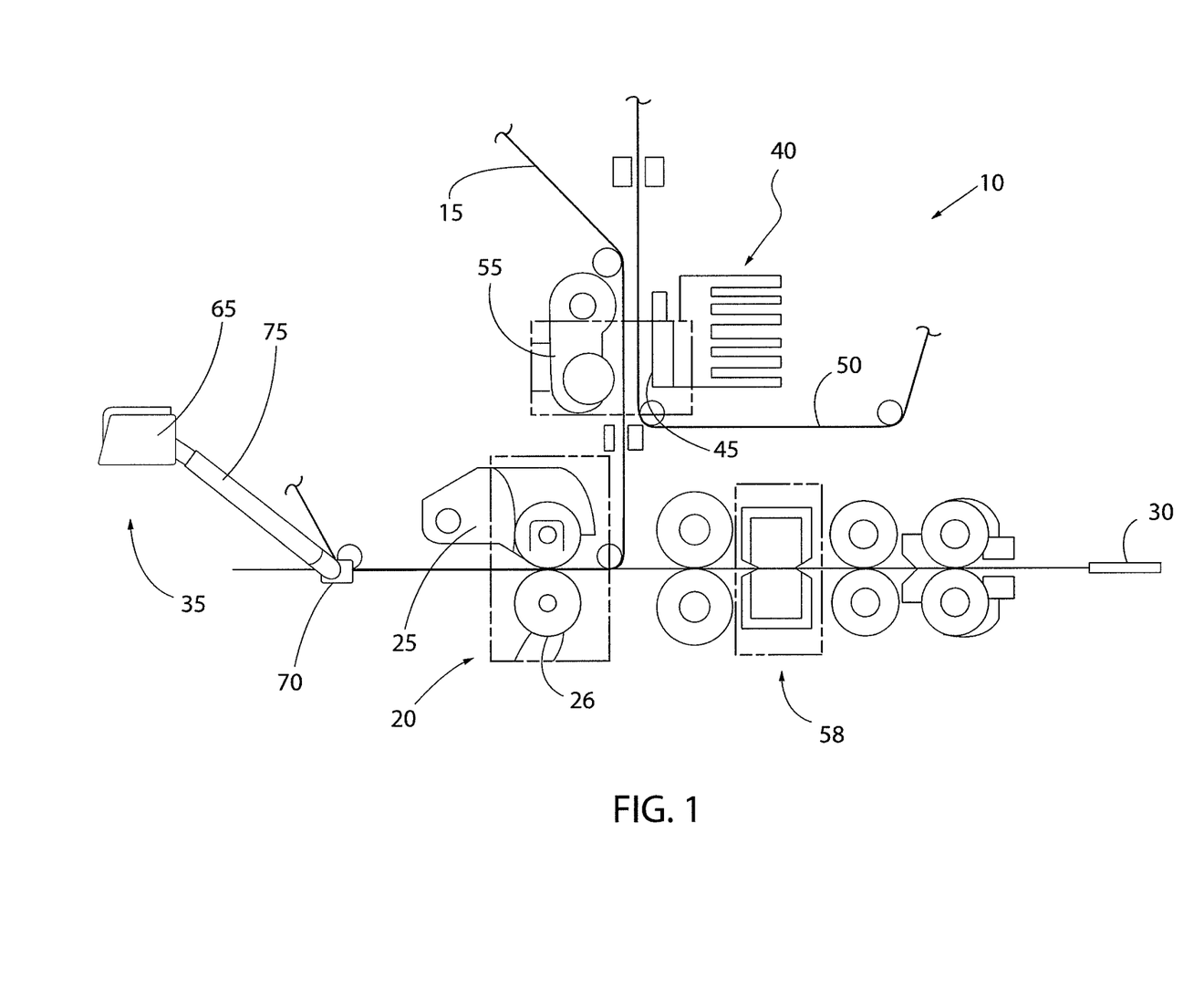
FIG. 1 is a side view of a printer incorporating a blower in accordance with one embodiment of the invention.

FIG. 1 shows selected components of a printing assembly. Not all components of the printing assembly are shown, however, for purposes of clarity and ease of discussion. Referring to FIG. 1, the intermediate thermal transfer printing assembly 10 may include an intermediate transfer media ("IT media") 15, a transfer assembly 20 including a transfer device 25 configured to transfer an image from the IT media 15 to the media card 30, and a blower 35. In some cases, the blower 35 may be incorporated into and form part of the transfer assembly 20.

The IT media 15 may be disposed between an IT media supply roll and an IT media take-up roll (not shown). The IT media supply roll may dispense the IT media 15 past a print station 40, where print dye may be applied to the IT media 15. Further downstream, the IT media 15 may extend past the transfer assembly 20, where portions of the IT media 15 bearing print may be transferred onto the media card 30.

The depicted printing assembly 10 may also include a color ribbon supply roll (not shown), a color ribbon take-up roll (not shown), and a ribbon printing head 45. The color ribbon supply roll may supply a color ribbon 50 that has, for example, a sequence of colorant panels including yellow (Y), magenta (M), cyan (C) and/or black (K) panels for imprinting of a range of colors or light/dark shades onto the IT media 15. The color ribbon 50 may be routed so as to be coextensive to the IT media 15 between the ribbon printing head 45 and a platen 55. The ribbon printing head 45 may then be thermally engaged to impart a printed image to a portion of the IT media 15.

The printed IT media 15 may then be routed downstream to the transfer assembly 20, as shown. The transfer assembly 20 is comprised of a transfer device 25 that is configured to engage the IT media 15 to impart a printed image to a surface of the media card 30. The transfer assembly 20 may include various types of transfer devices 25 for engaging the IT media 15. For example, in FIG. 1, the transfer device 25 is a heated compression roller that is opposed by an idler roller 26. Alternatively, the transfer device may be comprised of a pair of opposing heated compression rollers, arcuate platens defining opposed arcuate surfaces, reciprocating clamps, or other similar devices.

The media card 30 may, in some cases, be drawn from a card feeder or otherwise supplied to the printing assembly 10. Prior to arriving at the transfer assembly 20, the media card 30 may pass through an encoding station 58, where the media card 30 may be encoded with information. At the transfer assembly 20, the media card 30 may be coextensively aligned with a printed portion of the IT media 15.

Figure 2:
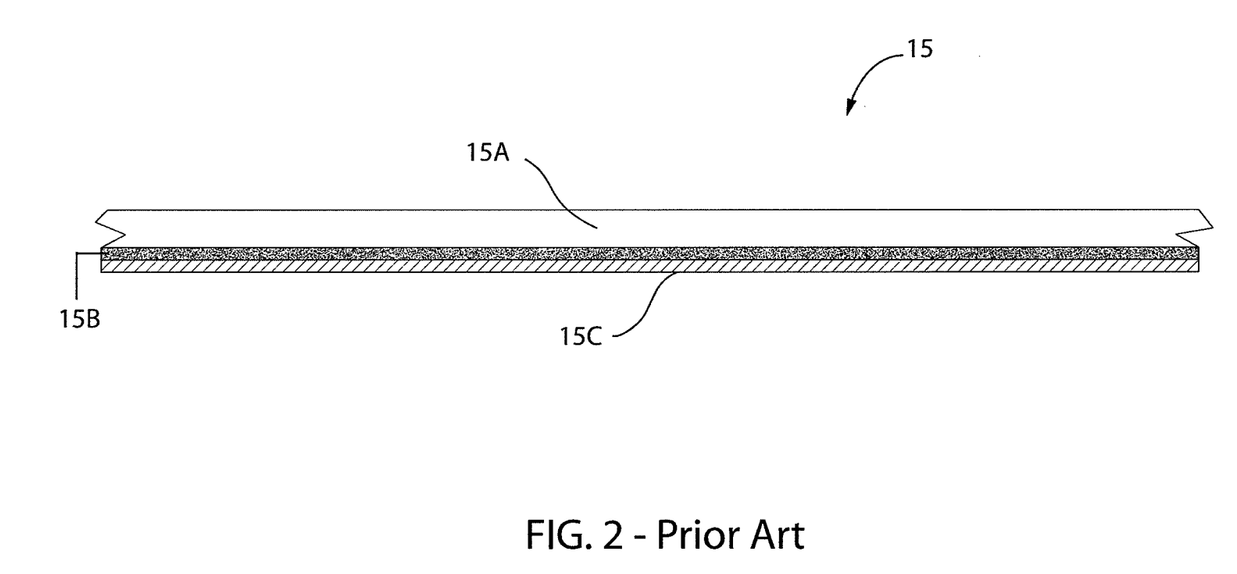
FIG. 2 is a side schematic illustration of an intermediate transfer media structured in accordance with the known prior art.

The transfer assembly 20 is thus configured to transfer an image from the IT media 15 to the media card 30 by receiving the media card 30 and the IT media 15 into the transfer assembly 20, compressing the IT media 15 between the transfer device 25 and the media card 30, expelling the media card 30 from the transfer assembly 20, and peeling the IT media 15 from the media card 30 such that the image is transferred from the IT media 15 to the media card 30. In this regard, conventional IT media 15 is depicted in FIG. 2. The conventional IT media 15 includes a carrier film 15A for supporting a release liner 15B and a print receiving surface 15C. Images (e.g., graphics, text, barcodes, and other indicia) are printed or otherwise formed on the print receiving surface 15C. Thus, when applied to the media card 30, the print receiving surface 15C would be disposed adjacent a printable surface of the media card 30. The release layer 15B may be thermally activatable for releasing the print receiving surface 15C. Non-thermally activated media and media supporting laminate patches may be provided in addition to, or instead of, the printed images noted above. In this regard, the IT media 15 facilitates transfer of the printed indicia to a media card or other printable media as will be apparent to one of ordinary skill in the art.

Figure 3:
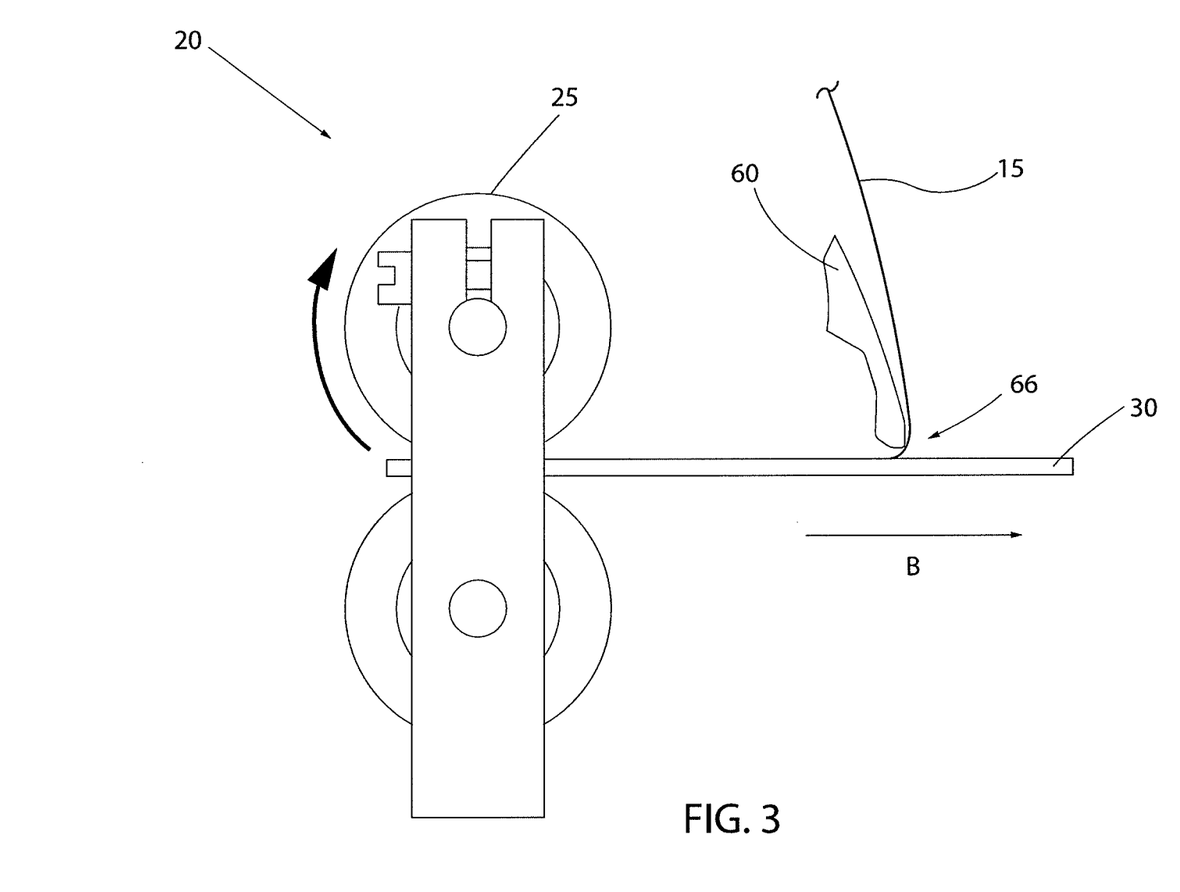
FIG. 3 is a side schematic illustration of a transfer assembly with a peel bar in accordance with one embodiment of the invention.

Once the IT media 15 has been applied to the media card 30 via the transfer device 25, the IT media 15 may be peeled from the media card 30, for example as the media card 30 is being expelled from the transfer assembly 20. In some cases, as shown in FIGS. 3 and 4, the IT media 15 is removed with the help of a peel bar 60, which may engage the IT media 15 in the area of peeling and facilitate removal of the IT media 15 at a specified angle with respect to the media card 30.

Figure 4:
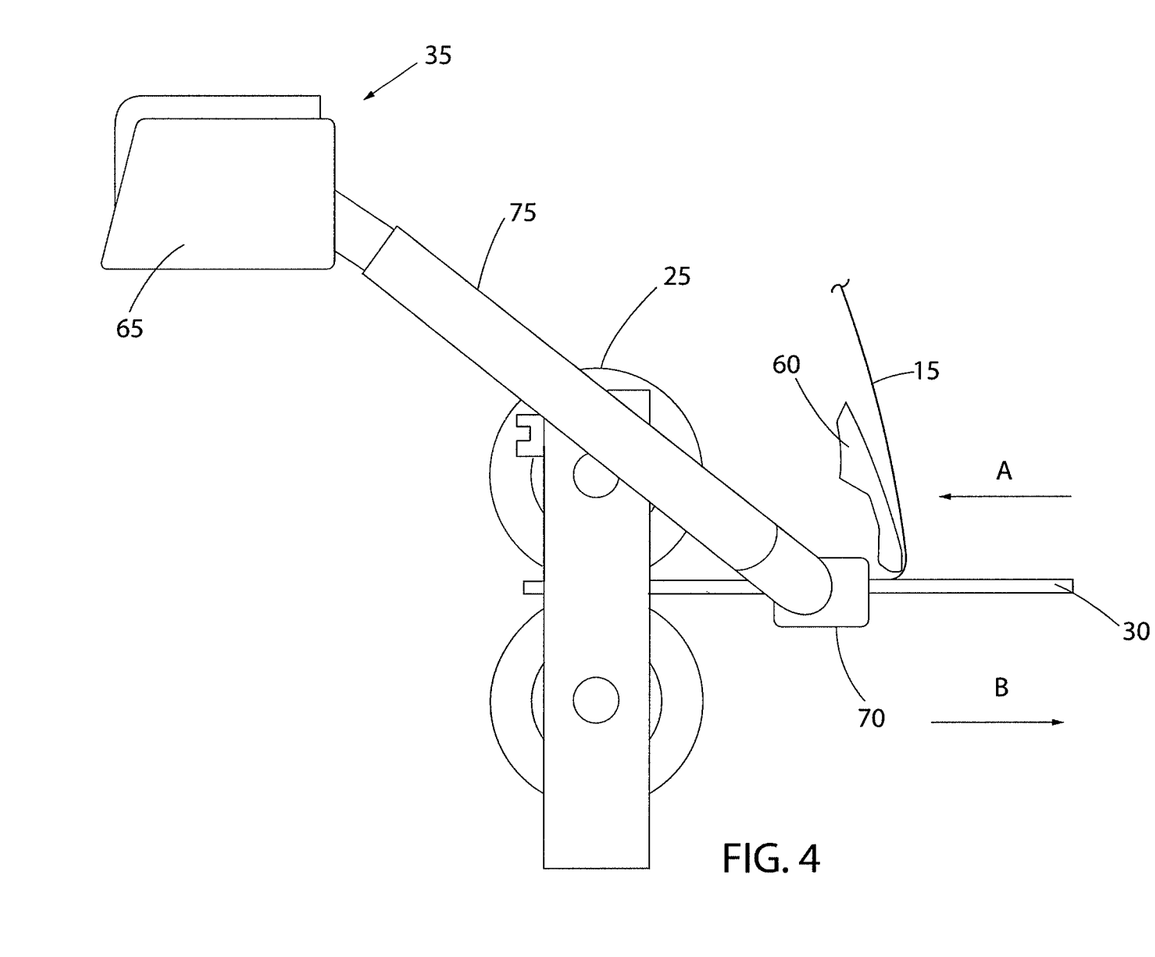
FIG. 4 is a side schematic illustration of the transfer assembly depicted in FIG. 3 showing the blower in accordance with one embodiment of the invention.

Referring to FIG. 4, the blower 35 may be configured to intermittently provide a cooling stream of air proximate the media card 30. Such a cooling stream may cause the IT media 15 to crystallize such that when the IT media 15 is peeled from the media card 30, the portions of the IT media 15 that have become more brittle due to the crystallization process are able to break more cleanly from other portions of the IT media 15 that have adhered to the media card 30. As a result, portions of the IT media 15 that may extend past the edges of the media card 30, creating flash, can be removed at the same time that the IT media 15 is peeled from the media card 30.

Figure 5:
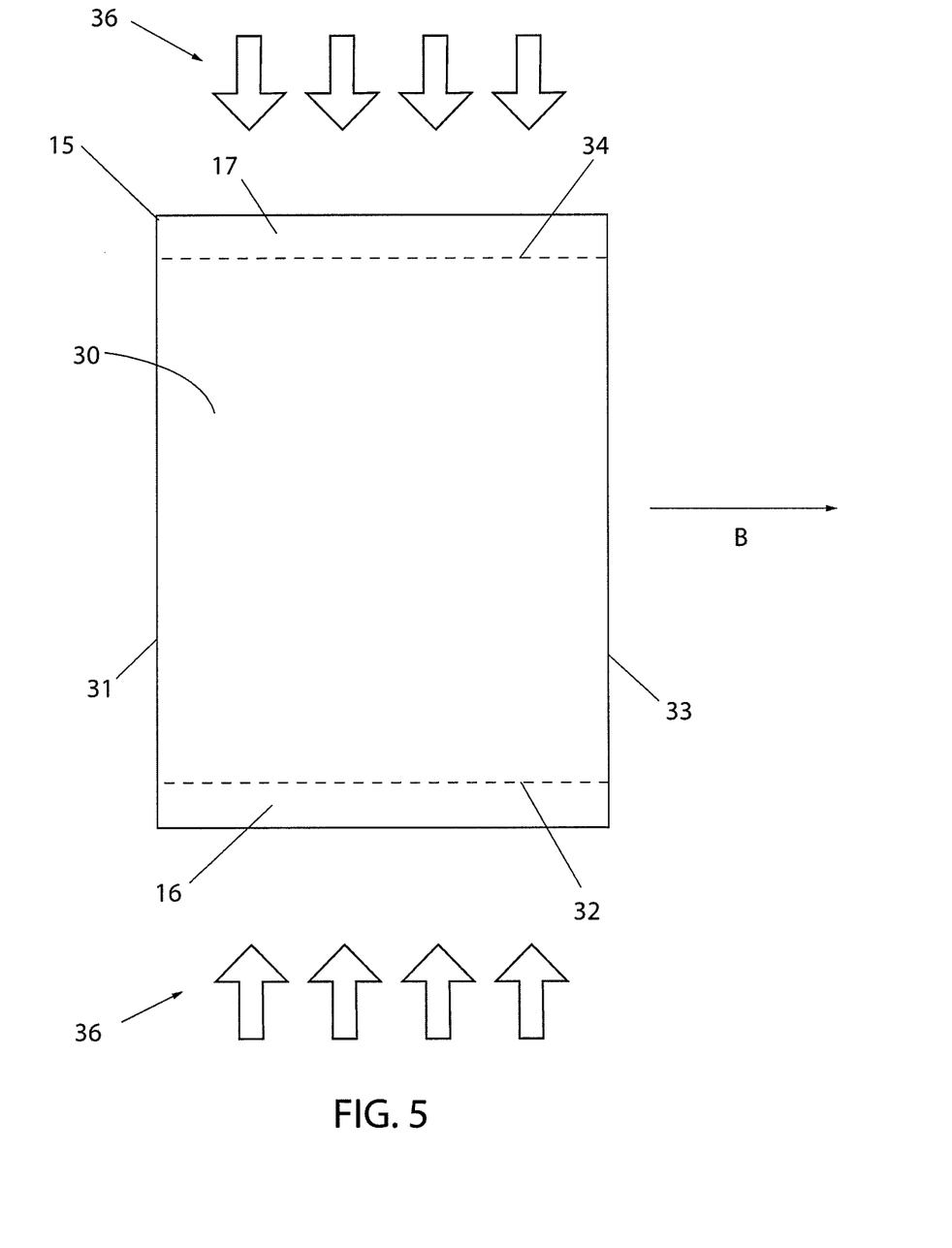
FIG. 5 is a schematic illustration of an intermediate transfer media applied to a product in accordance with one embodiment of the invention.

FIG. 5 depicts the cooling of portions of the IT media 15, as described above. In FIG. 5, for example, the media card 30 defines four edges 31, 32, 33, 34, with edges 32, 34 aligned with the direction B in which the media card 30 is expelled from the transfer assembly 20. The IT media 15 may extend over one or more edges of the media card 30, resulting in flash 16, 17. For example, in FIG. 5, the IT media 15 extends over the edges 32, 34. However, by directing a cooling stream of air 36 towards the media card 15, and especially towards the flash areas 16, 17, the IT media 15 in those areas may crystallize, allowing for a more successful peeling operation that removes the excess IT media 15 in the flash areas 16, 17. In other words, as a result of the cooling of the IT media 15 in the flash areas 16, 17, the peeling of the IT media carrier film 15A creates a break in the IT media 15 through the print receiving surface 15C that is aligned with the edges 32, 34 of the media card 30, thereby removing the excess IT media 15 in the flash areas 16, 17. Thus, in some cases, the cooling stream of air 36 may be directed towards one or more edges of the media card 30, for example, to enable peeling operations that result in IT media 15 edges that are substantially flush with the media card edges 31, 32, 33, 34.

In some embodiments, the media card 30 and the IT media 15 are received into the transfer assembly 20 along a first direction A and are expelled from the transfer assembly 20 along a second direction B. For example, the transfer assembly may be a single-pass double-sided transfer assembly that is configured to transfer first and second images from the IT media 15 to opposed image-receptive surfaces of the media card 30 in a single pass of the media card 30 through the transfer assembly 20, such as described in U.S. application Ser. No. 11/406,548, filed on Apr. 19, 2006, entitled "Single-Pass Double-Sided Image Transfer Process and System," the contents of which are incorporated by reference herein.

Figure 6:
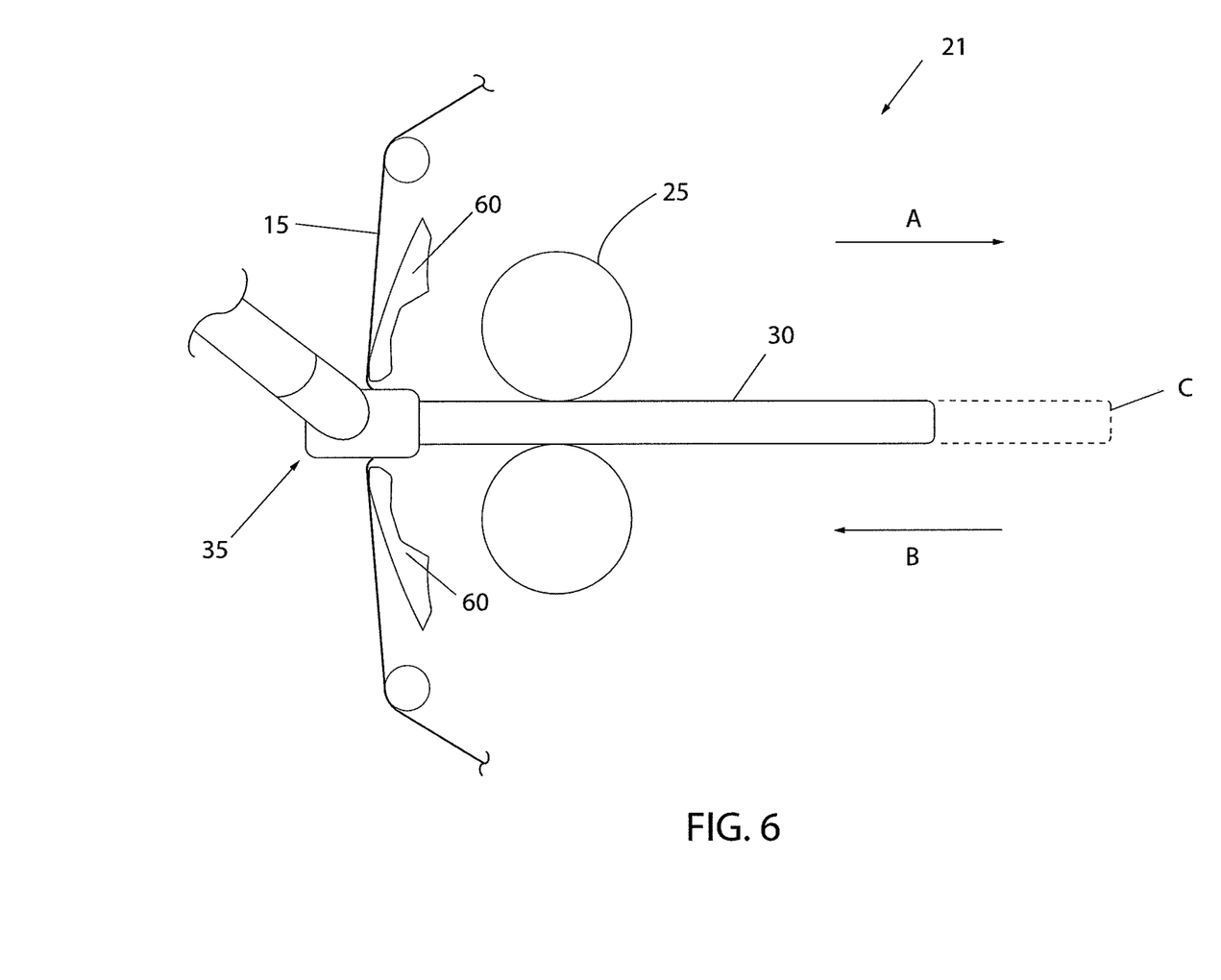
FIG. 6 is a schematic perspective view of a single-pass double-sided image transfer assembly and a blower in accordance with another embodiment of the invention.

For instance, in FIG. 6, a single-pass double-sided transfer assembly 21 is shown in which the media card 30 and IT media 15 are received into the transfer assembly 21 along the A direction and are expelled along the B direction. As the media card 30 and IT media 15 are received into the transfer assembly 21 and pass through the transfer device 25 (in this case, for example, a pair of heated compression rollers), first and second images are imparted on opposed surfaces of the media card 30. Once the media card 30 reaches a certain position (for example, when the media card 30 is received into the transfer assembly 21 to a position C, shown in dashed lines), the tension in the IT media 15 may facilitate expulsion of the media card 30 from the transfer assembly 21 along the B direction. As the media card 30 and IT media 15 are expelled, the blower 35 may be activated as described below to provide a cooling stream of air near the media card 30.

Figure 9:
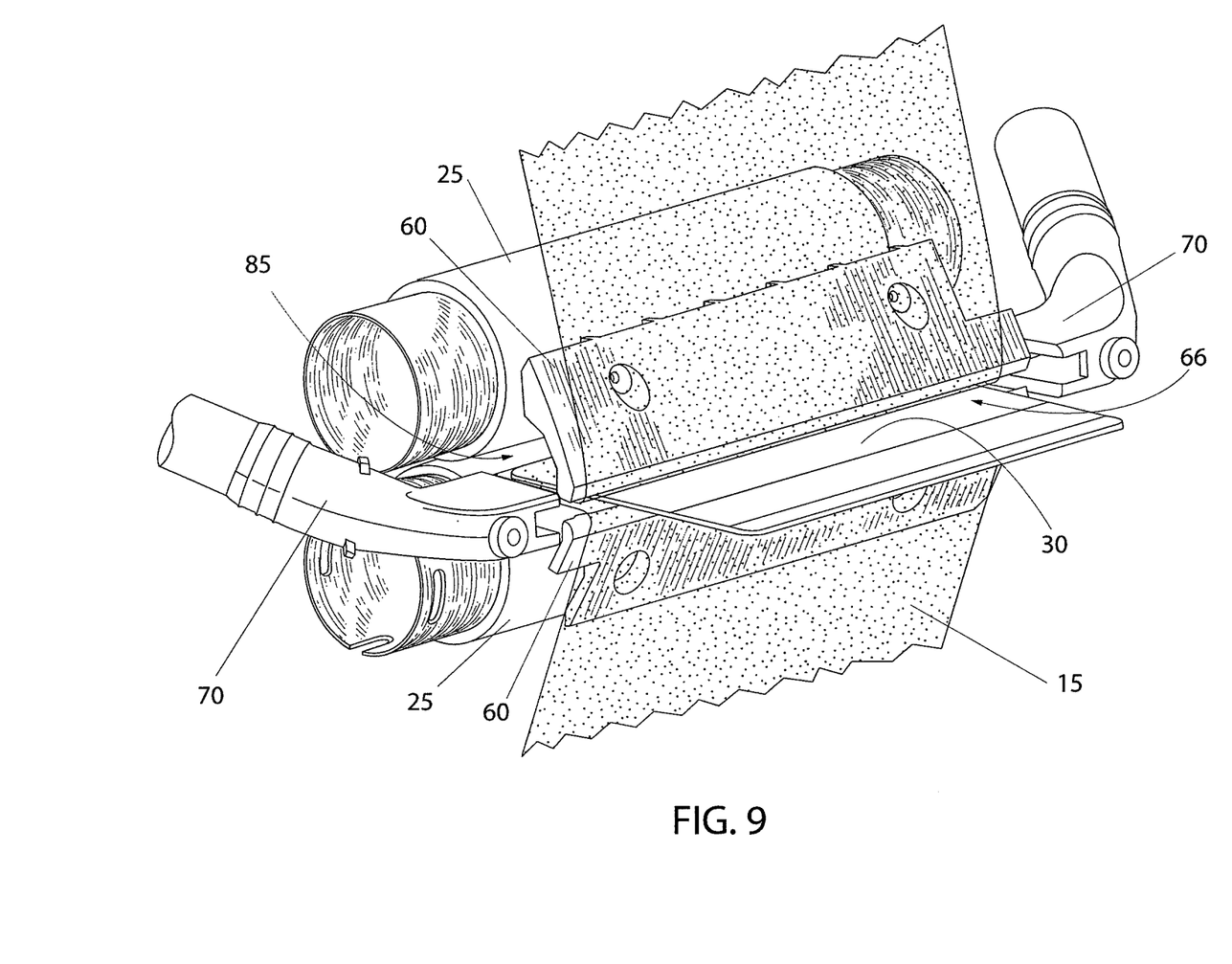
FIG. 9 is a perspective view of a transfer assembly including peel bars defining a chamber in accordance with one embodiment of the invention.

In some embodiments, the blower 35 is configured to selectively provide the cooling stream of air proximate the media card 30 when the media card 30 is expelled from the transfer assembly 20, 21 along the second direction B, but not provide the cooling stream of air proximate the media card 30 when the media card 30 is received into the transfer assembly 20, 21 along the first direction A. In this way, the IT media 15 may be effectively heated by the transfer device 25 as the media card 30 is received by the transfer assembly 20, 21 so as to release the print receiving surface 15C of the IT media 15 and impart the images to the media card 30, without the counteraction of the cooling stream of air. Once the IT media 15 has been applied and the media card 30 is being expelled from the transfer assembly 20, the blower 35 may provide a cooling stream of air and facilitate removal of the IT media 30, as described above. In other embodiments, the cooling stream of air may be provided proximate an interface 66 between the IT media and the media card 30 while the IT media 15 is peeled from the media card 30 (see FIGS. 3 and 9).

In this regard, the blower 35 may be configured to be switched on and off such that the cooling stream of air is provided when the blower is switched on and is not provided when the blower is switched off. Alternatively, the blower 35 may be configured to continuously generate a cooling stream of air, but may include a valve configured to block the flow of air at certain times (e.g., when the media card 30 is being received by the transfer assembly 20). Similarly, the blower 35 may include a diverter or may otherwise direct the cooling stream of air away from the media card 30 when the media card 30 is being received by the transfer assembly 20.

Figure 7:
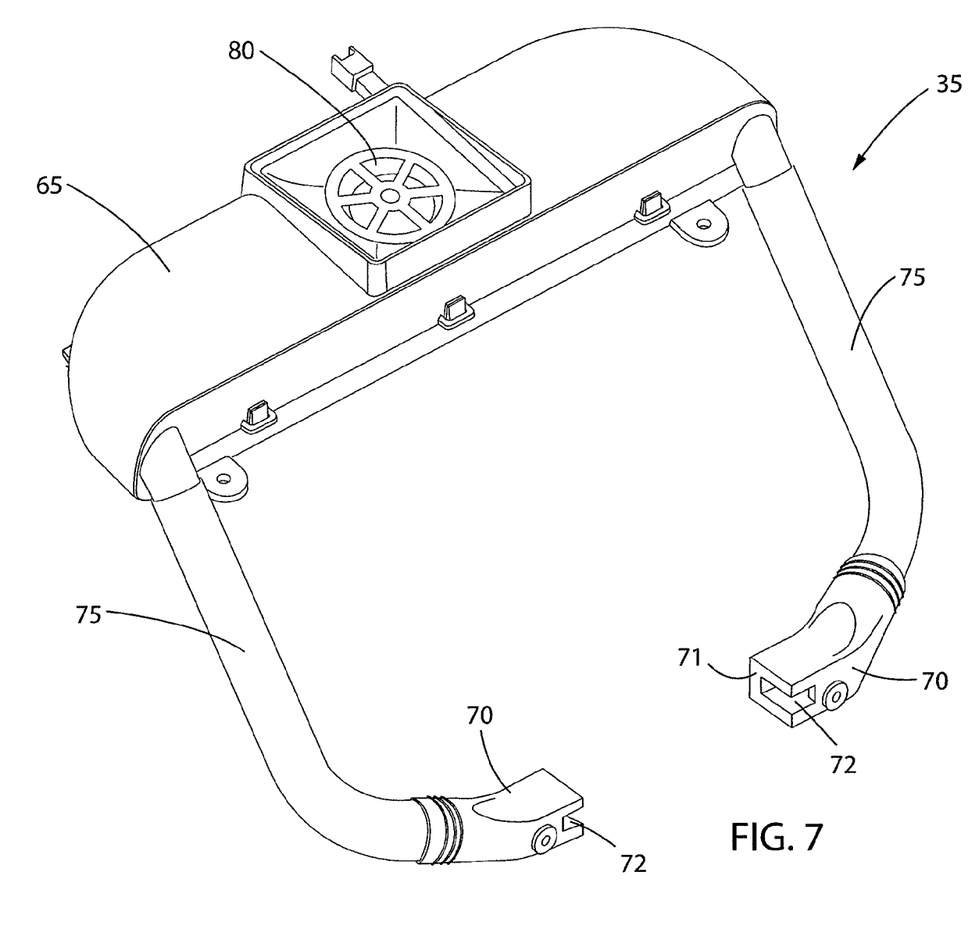
FIG. 7 is a perspective view of a blower incorporating a single plenum and two nozzles in accordance with one embodiment of the invention.
Figure 8:
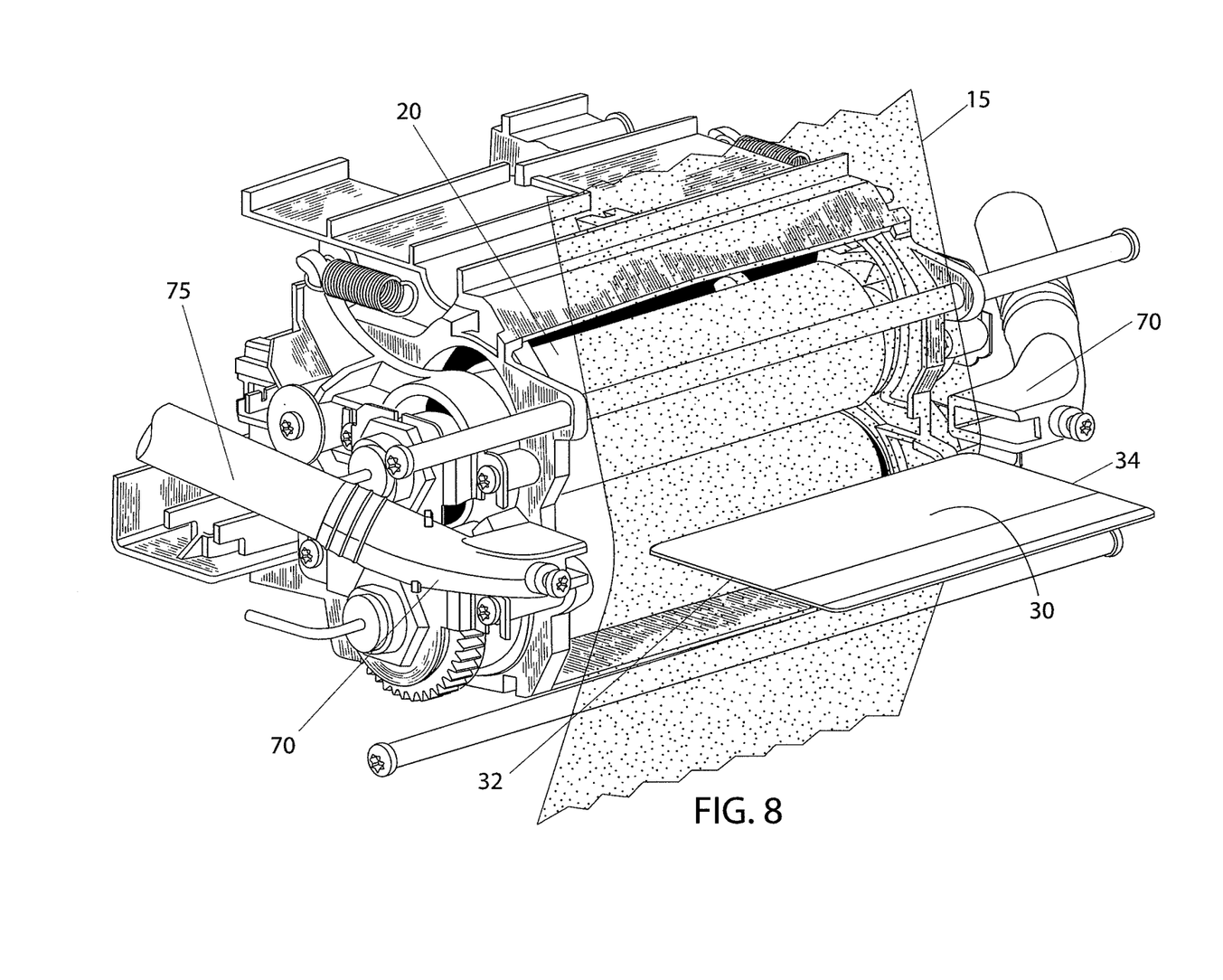
FIG. 8 is a perspective view of a transfer assembly showing nozzles of the blower positioned with respect to the transfer assembly and product in accordance with one embodiment of the invention.

Turning now to FIG. 7, the blower 35 may include a single plenum 65 in fluid communication with two nozzles 70. The plenum 65 may, for example, be connected to the nozzles 70 via hoses 75, tubes, piping, or other components configured to allow airflow therethrough. The blower 35 may also include a centrifugal fan 80. The centrifugal fan 80 may be configured to provide a certain volume of air at a selected pressure, which may facilitate the targeting of certain portions of the media card 30 and IT media 15 (such as the flash areas 16, 17) without affecting the heated application of the IT media 15 to the media card 30 occurring at the transfer device 25 (shown in FIGS. 4 and 5). In this regard, each nozzle 70 may be configured to direct air towards the media card 30 while reducing the flow of air towards the transfer device 25. For example, as shown in FIG. 7, the nozzles 70 may include a closed side 71 and an open side 72, with the closed side 71 positioned towards the transfer device 25 and the open side 72 positioned away from the transfer device 25, such that air is encouraged to flow towards the media card 30 and away from the transfer device 25. This feature is also illustrated in FIG. 8.

Furthermore, each nozzle may be positioned proximate a respective edge of the media card 30 to focus the flow of the cooling stream of air on the edges most likely to experience flash issues. For example, in printing operations in which the long edge of the media card 30 is the leading edge (long edge leading, or LEL operations), the short edges (or the edges aligned with the direction of travel of the media card 30 into and out of the transfer assembly 20) may be more prone flash problems than the long edges. This may be due to the decreased amount of IT media 15 along the short edges and the decreased bonding that may occur within the IT media 15 to encourage removal of the excess portions of IT media 15 from the edges. In this case, the nozzles 70 may be configured as shown in FIG. 8 to target the edges 32, 34 most likely to experience flash.

In some cases, as mentioned above and shown in FIG. 9, the transfer assembly 20 includes one or more peel bars 60 configured to facilitate removal of the IT media 15 from the media card 30. The peel bar 60 may be positioned proximate the surface of the media card 30 such that the peel bar 60 and the transfer device 25 define a chamber 85. In this way, each nozzle 70 may be positioned at an end of the chamber 85, as shown, such that the cooling stream of air is directed through the chamber and passes over the surfaces of the media card 30 between the targeted edges 32, 34.

Figure 10:
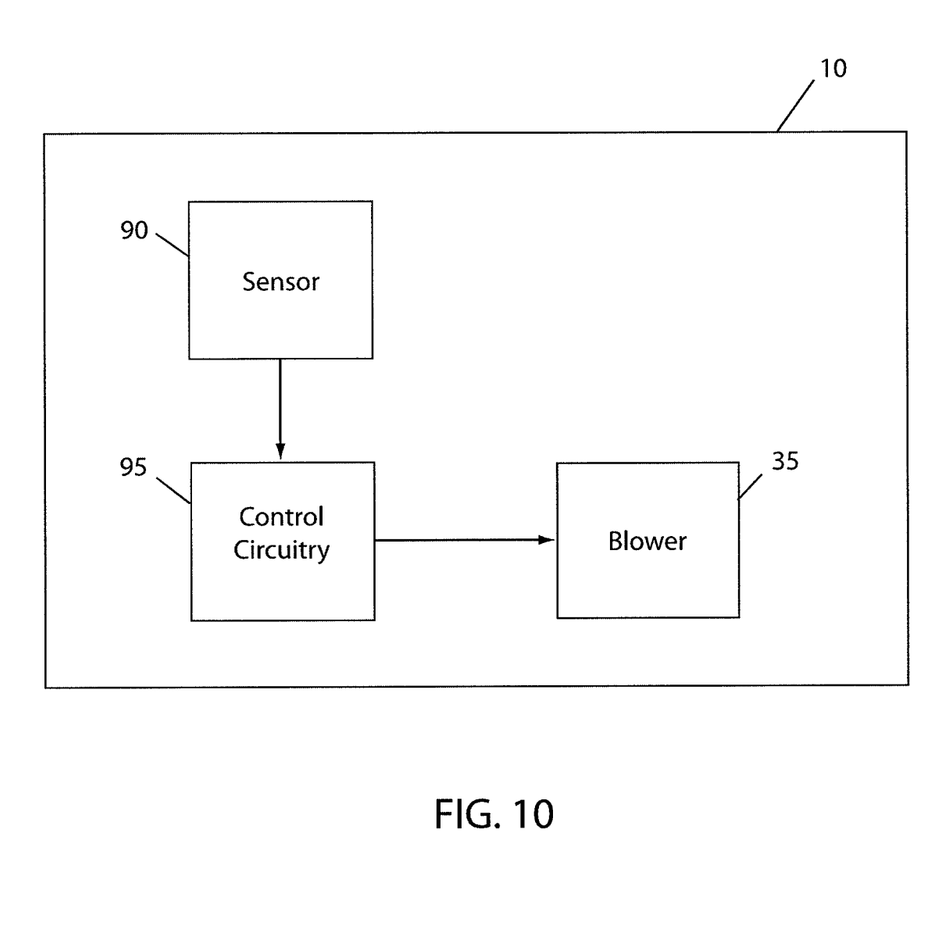
FIG. 10 is a schematic illustration of a printing assembly including a sensor and control circuitry in accordance with another embodiment of the invention.

Referring to FIG. 10, in some embodiments, the printing assembly 10 includes one or more sensors 90 and control circuitry 95 disposed in communication with the sensor(s). The sensors 90 may be configured to detect the position of the media card 30 relative to the transfer assembly 20 and may transmit signals to the control circuitry 95 that are used when controlling activation of the blower 35 based, at least in part, on the location of the media card 30. Thus, the control circuitry 95 may be configured to engage the blower 35 to provide the cooling stream of air proximate the media card 30 when the media card 30 is disposed in a first position relative to the transfer assembly 20 and not provide the cooling stream of air proximate the media card 30 when the media card 30 is disposed in a second position relative to the transfer assembly.

For example, the sensors 90 may detect the leading and/or trailing edge of the media card 30 as it is advanced towards and/or away from the transfer assembly 20. Thus, referring to FIG. 11, as the trailing edge 33 of the media card 30 exiting the transfer assembly 20 is detected by a first sensor 90, the sensor 90 may communicate the detection to the control circuitry 95, and the control circuitry 95 may turn on the blower 35. When the leading edge 31 of the media card 30 is detected by a second sensor 90' upstream (in the direction B) of the first sensor 90, the control circuitry 95 may turn off the blower 35 in preparation for entry of the next media card 30 into the transfer assembly 20.

Figure 11:
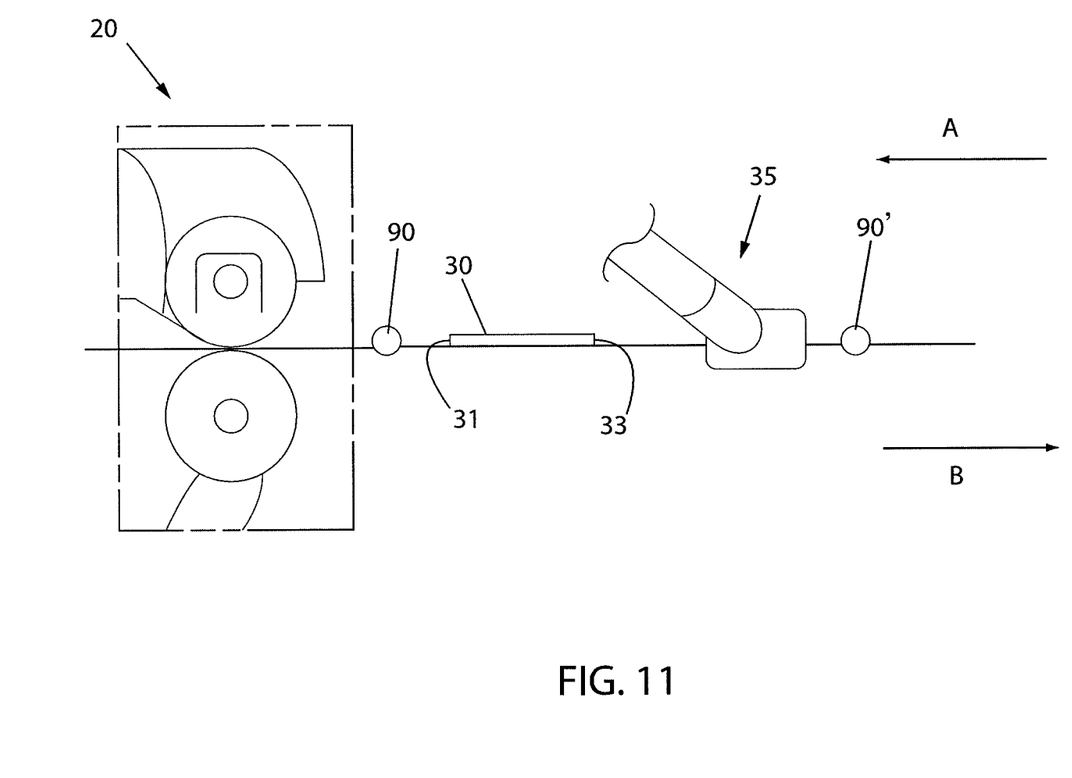
FIG. 11 is a schematic illustration of a printing assembly including sensors positioned along a transport path of the product in accordance with one embodiment of the invention.

In another example, not shown, a single sensor 90 may detect the leading edge 31 before detecting the trailing edge 33 of the media card 30, signaling the approach of the media card 30 towards the transfer assembly 20, and may instruct the control circuitry 95 to deactivate the blower 35. Upon expulsion from the transfer assembly 20, the sensor 90 may detect the trailing edge 33 before detecting the leading edge 31 and may thus instruct the control circuitry 95 to activate the blower 35.

As will be apparent to one of ordinary skill in the art in view of this disclosure, the inventive concepts described herein do not require that the blower be turned on and/or turned off or activated and/or deactivated in all applications. Indeed, in one exemplary embodiment, the blower need not be turned off/deactivated and the cooling stream of air may be provided or not provided proximate the product, cooling chamber, and/or IT media using valves and/or other similar air flow controlling devices.

The sensors 90 may be configured to sense other conditions, in addition to or instead of the position of the media card 30. For example, a sensor 90 may be configured to detect the position of the IT media 15 or may be configured to sense airflow or temperature conditions. For example, one or more sensors 90 may be configured to detect the ambient temperature, the temperature of the media card 30, the temperature of the IT media 15, or the temperature of the cooling stream of air before or after it is provided to the media card 30. In this way, the sensors 90 may be able to help determine when the cooling stream of air should be directed to the media card 30 and to which locations of the media card 30 the cooling stream of air should be directed.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An intermediate transfer printing assembly configured to transfer an image to a product, the intermediate transfer printing assembly comprising:
   an intermediate transfer media comprising an image disposed thereon;
   a transfer assembly comprising a transfer device, wherein the transfer assembly is configured to transfer the image from the intermediate transfer media to the product by:
      receiving the product and the intermediate transfer media into the transfer assembly along a first direction,
      compressing the intermediate transfer media between the transfer device and the product,
      expelling the product from the transfer assembly along a second direction, and
      peeling the intermediate transfer media from the product such that the image is transferred from the intermediate transfer media to the product; and
   a blower configured to intermittently provide a cooling stream of air along and in contact with a peel interface defined where the intermediate transfer media is peeled from the product, the blower comprising a first nozzle having a closed side positioned toward the transfer device and an open side positioned away from the transfer device, the closed side opposing the open side.

2. The printing assembly of claim 1, wherein the blower is configured to selectively provide the cooling stream of air proximate the peel interface between the intermediate transfer media and the product when the product is expelled from the transfer assembly along the second direction, but not provide the cooling stream of air proximate the peel interface between the intermediate transfer media and the product when the product is received into the transfer assembly along the first direction.

3. The printing assembly of claim 1, wherein the product defines a surface and an edge, and wherein the blower is configured to direct the cooling stream of air proximate the edge and along the surface.

4. The printing assembly of claim 1, wherein the transfer assembly is a single-pass double-sided transfer assembly configured to transfer first and second images from the intermediate transfer media to opposed image-receptive surfaces of the product.

5. The printing assembly of claim 1, further comprising:
   at least one sensor configured to detect the position of the product relative to the transfer assembly; and
   control circuitry in communication with the at least one sensor and configured to engage the blower to provide the cooling stream of air proximate the peel interface between the intermediate transfer media and the product when the product is disposed in a first position relative to the transfer assembly and not provide the cooling stream of air proximate the peel interface between the intermediate transfer media and the product when the product is disposed in a second position relative to the transfer assembly.

6. The printing assembly of claim 1, wherein the blower comprises a single plenum in fluid communication with the first nozzle and a second nozzle.

7. The printing assembly of claim 6, wherein the product defines two edges extending in the first direction, and wherein each of the first and second nozzles is positioned proximate a respective edge of the product.

8. The printing assembly of claim 6, wherein the transfer assembly comprises at least one peel bar positioned proximate a surface of the product, wherein the peel bar and the transfer device define a chamber, and wherein each of the first and second nozzles is positioned at either end of the chamber and directs the cooling stream of air through the chamber.

9. The printing assembly of claim 6, wherein the first and second nozzles are configured to provide substantially opposing streams of air.

10. The printing assembly of claim 6, wherein each of the first and second nozzles is connected to the plenum by a respective conduit.

11. The printing assembly of claim 6, wherein the first and second nozzles are configured to direct cooling streams of air proximate the peel line defined where the intermediate transfer media is peeled from the product while limiting the flow of the cooling streams of air proximate the transfer assembly.

12. The printing assembly of claim 6, wherein the product defines two edges extending in the first direction and a surface disposed there between, and wherein each of the first and second nozzles is positioned proximate a respective edge of the product and configured to direct respective cooling streams of air in substantially opposing directions.

13. The printing assembly of claim 1, wherein the blower comprises a centrifugal fan.

14. An intermediate transfer printing assembly configured to transfer an image to a product, the intermediate transfer printing assembly comprising:

an intermediate transfer media comprising an image disposed thereon;

a transfer assembly comprising a transfer device, wherein the transfer assembly is configured to transfer the image from the intermediate transfer media to the product;

at least one sensor configured to detect the position of the product relative to the transfer assembly;

a blower configured to provide a cooling stream of air along and in contact with a peel interface defined where the intermediate transfer media is peeled away from the product, the blower including a first nozzle having a closed side positioned toward the transfer device and an open side positioned away from the transfer device, the closed side opposing the open side; and control circuitry in communication with the at least one sensor and configured to engage the blower to provide the cooling stream of air proximate the product when the product is disposed in a first position relative to the transfer assembly and not provide the cooling stream of air proximate the product when the product is disposed in a second position relative to the transfer assembly.

15. The printing assembly of claim 14, wherein the sensor and control circuitry are configured to selectively engage the blower to provide the cooling stream of air when the product is expelled from the transfer assembly, but not provide the cooling stream of air when the product is received into the transfer assembly.

16. The printing assembly of claim 14, wherein the product defines a surface and an edge, and wherein the blower is configured to direct the cooling stream of air towards the edge and along the surface.

17. The printing assembly of claim 14, wherein the transfer assembly is a single-pass double-sided transfer assembly configured to transfer first and second images from the intermediate transfer media to opposed image-receptive surfaces of the product.

18. The printing assembly of claim 14, wherein the blower comprises a single plenum in fluid communication with the first nozzle and a second nozzle.

19. The printing assembly of claim 14, wherein the blower comprises a centrifugal fan.

20. An intermediate transfer printing assembly configured to transfer an image to a product, the intermediate transfer printing assembly comprising:

an intermediate transfer media comprising an image disposed thereon;

a transfer assembly comprising a transfer device, wherein the transfer assembly is configured to transfer the image from the intermediate transfer media to the product by:

receiving the product and the intermediate transfer media into the transfer assembly along a first direction such that the intermediate transfer media is compressed between the transfer device and the product, expelling the product from the transfer assembly along a second direction such that the intermediate transfer media is peeled from the product, providing, via a first nozzle having a closed side positioned toward the transfer device and an open side positioned away from the transfer device and opposing the closed side, a cooling stream of air along and in contact with a peel interface defined where the intermediate transfer media is peeled away from the product while the intermediate transfer media is peeled from the product.

21. The printing assembly of claim 20 further comprising:
at least one sensor configured to detect the position of the product relative to the transfer assembly; and
control circuitry in communication with the at least one sensor and configured to engage a blower to provide the cooling stream of air proximate the product when the intermediate transfer media is peeled from the product.

22. The printing assembly of claim 20, wherein the transfer assembly comprises a blower including a single plenum in fluid communication with the first nozzle and a second nozzle that are configured to provide the cooling stream of air.

23. The printing assembly of claim 22, wherein the product defines two edges extending in the first direction and a surface disposed there between, and wherein each of the first and second nozzles is positioned proximate a respective edge of the product and configured to direct respective streams of air in substantially opposing directions.

24. The printing assembly of claim 22, wherein the blower comprises a centrifugal fan.

\* \* \* \* \*